April 21, 1931.  F. J. TILLMAN  1,802,320
MEASURING MACHINE
Filed March 8, 1922  3 Sheets-Sheet 1
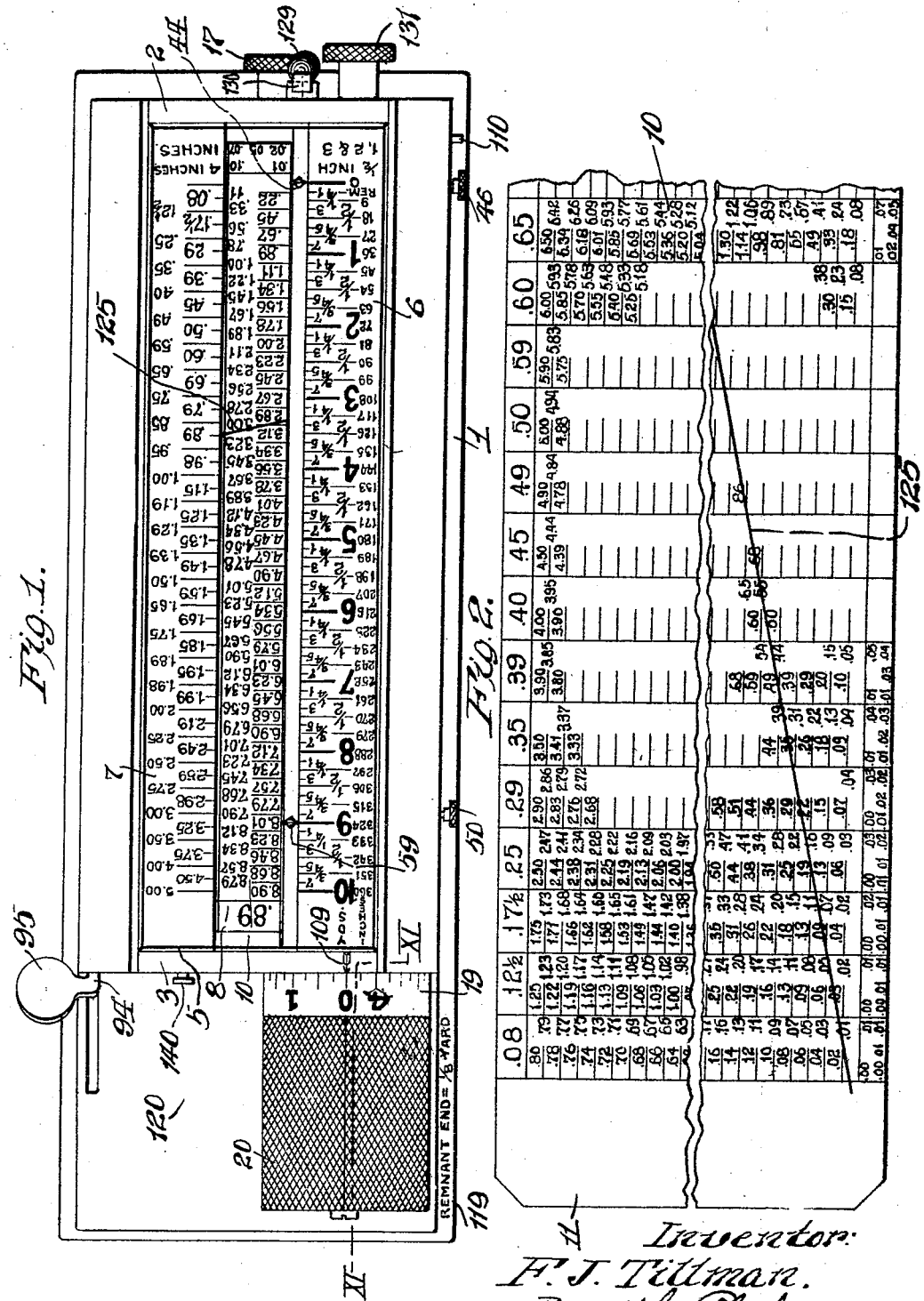
Inventor:
F. J. Tillman.
By H. G. Fletcher
Atty.

April 21, 1931. F. J. TILLMAN 1,802,320
MEASURING MACHINE
Filed March 8, 1922 3 Sheets-Sheet 2
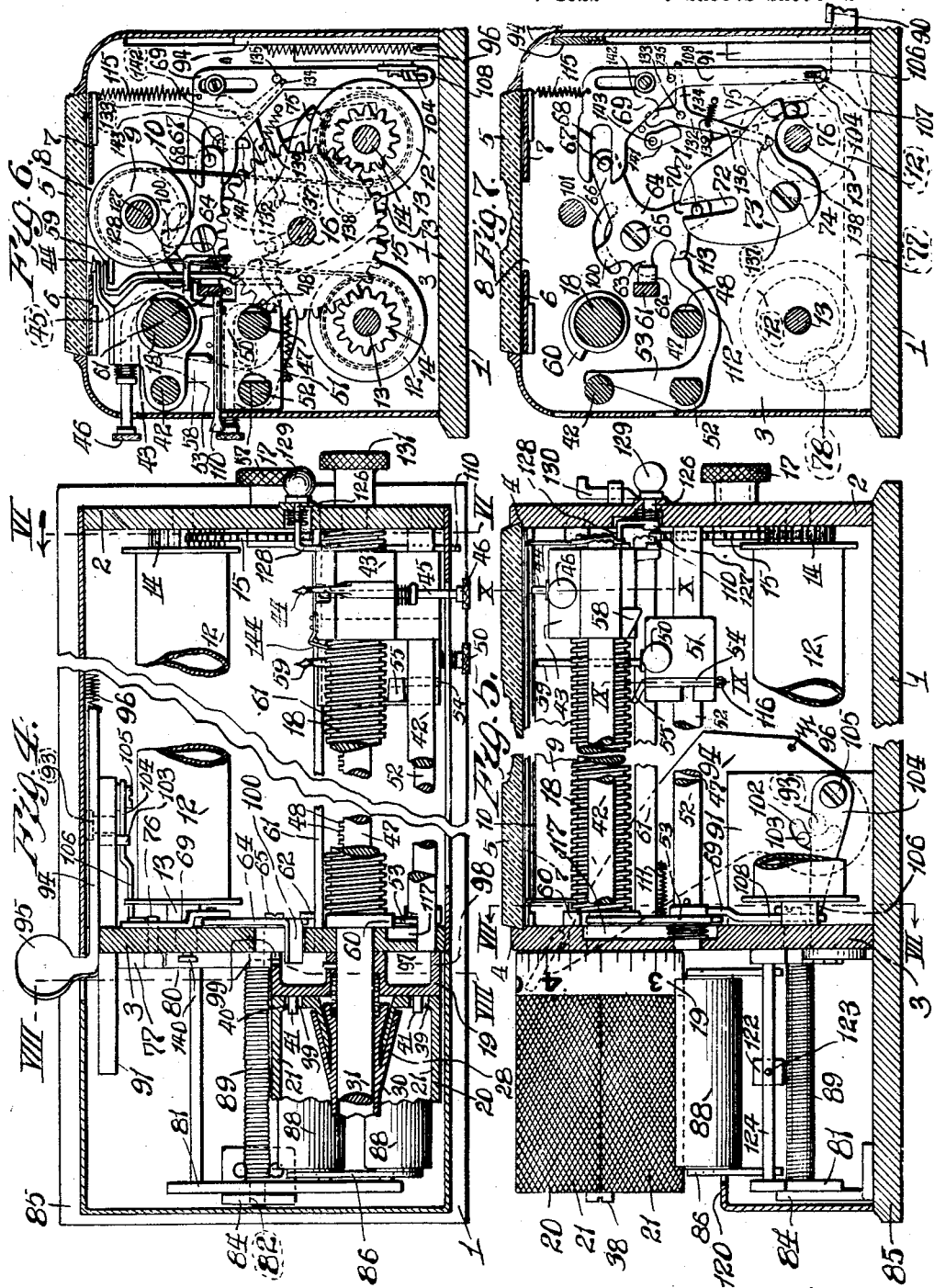

April 21, 1931.  F. J. TILLMAN  1,802,320
MEASURING MACHINE
Filed March 8, 1922   3 Sheets-Sheet 3
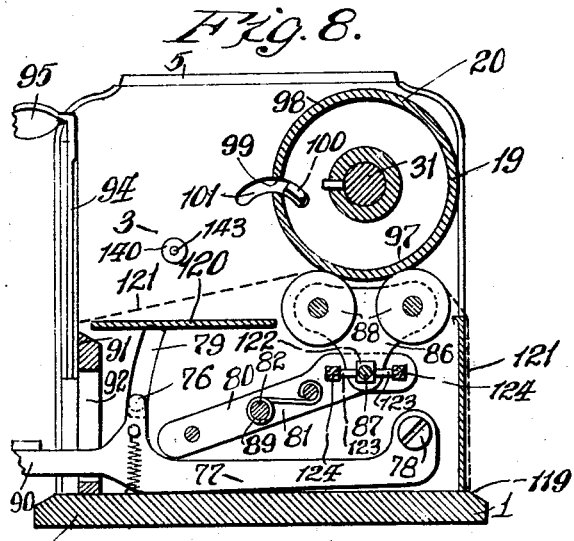
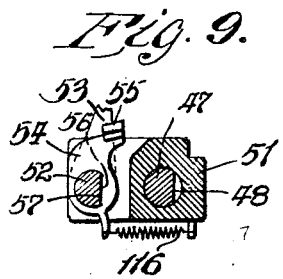
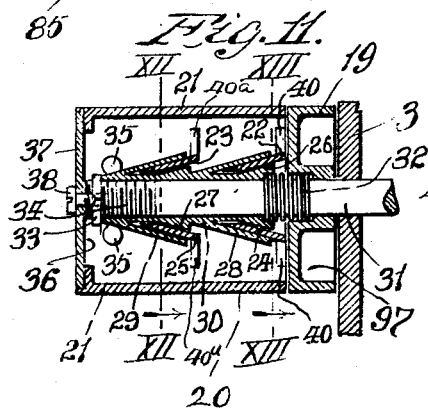
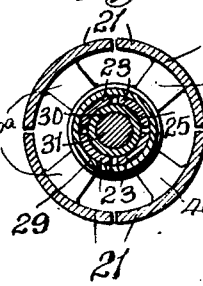
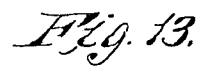
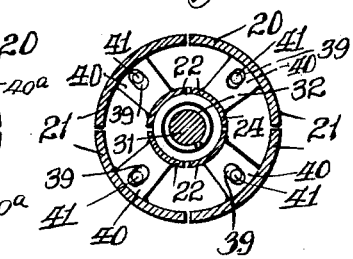
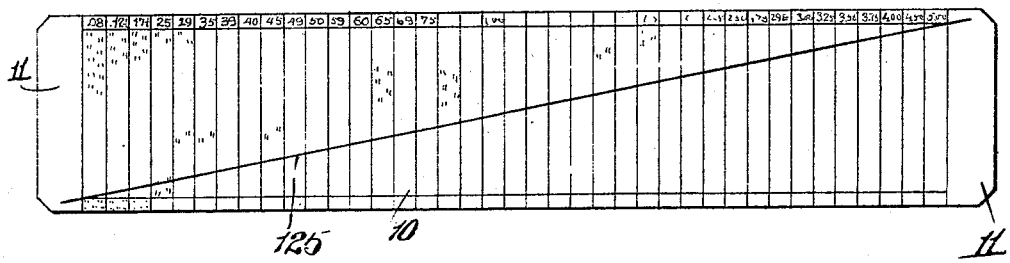
Inventor:
F. J. Tillman.
By H. G. Fletcher, atty.

Patented Apr. 21, 1931

1,802,320

UNITED STATES PATENT OFFICE

FERDINAND J. TILLMAN, OF ST. LOUIS, MISSOURI, ASSIGNOR, BY MESNE ASSIGNMENTS, TO AMERICAN YARD-O-METER CORPORATION, OF ST. LOUIS, MISSOURI, A CORPORATION OF MISSOURI

MEASURING MACHINE

Application filed March 8, 1922. Serial No. 541,953.

The primary object of this invention is to provide an improved device to be placed on the counters of stores and the like for accurately measuring yardage material as the material is fed through the device as well as providing improved computing or calculating means for automatically indicating the prices of yardage or fractions thereof while the material is being measured, or after it has been measured.

A further object of the invention is to provide improved means in a device of this character for preventing cutting or marking of the material unless the material has been accurately measured, and other means for preventing the device from being operated after a quantity of material has been measured until the yardage indicating carriage has been returned to neutral or zero position, so as to provide accuracy in each succeeding measuring operation.

A still further object of the invention is to provide a setting carriage for predetermining the amount of material to be measured, said setting carriage being co-operable with a locking device and an indicating carriage, said indicating carriage indicating the amount of goods being measured, and cooperating with the setting carriage, causing the locking device to actuate.

Figure 1 is a plan view of this improved device.

Figure 2 is an elevation of the price indicating chart or sheet, portions thereof being broken away.

Figure 3 is a diagrammatic elevation of the price indicating chart reduced in size.

Figure 4 is a sectional plan view of Fig. 1 the intermediate parts thereof being broken away, the top of the frame and the chart sheet which is co-operable with the device removed.

Figure 5 is a side elevation of the parts disclosed in Fig. 4, the side of the frame being removed and the intermediate portion thereof being broken away.

Figure 6 is a vertical section taken approximately on the line VI—VI of Fig. 4.

Figure 7 is a vertical cross section taken approximately on the line VII—VII of Fig. 5.

Figure 8 is a vertical cross section taken approximately on the line VIII—VIII of Fig. 4.

Figure 9 is a transverse vertical section taken through the setting carriage on line IX—IX of Fig. 5.

Figure 10 is a transverse vertical section taken through the indicating carriage on line X—X of Fig. 5.

Figure 11 is a fragmentary longitudinal section taken on the line XI—XI of Fig. 1, disclosing an improved adjustable feed roller used in connection with this device.

Figure 12 is a transverse vertical section taken on the line XII—XII of Fig. 11.

Figure 13 is a transverse vertical section taken on the line XIII—XIII of Fig. 11.

Referring to the drawings, the base 1 is provided with upwardly extending opposing end members 2 and 3, the upper edges 4, Fig. 5, of said end members or walls supporting a glass cover plate 5, and supported between said end members 2 and 3 beneath the cover plate 5 is a quantity scale 6, and paralleling said scale 6, and spaced apart therefrom is a grade scale 7, said scale 7 being arranged beneath the cover plate 5 similar to the scale 6, the spacing provided between said scales 6 and 7 forming a longitudinal sight opening 8.

Supported from and between the end members 2 and 3 is a guiding roller 9, Fig. 6, said roller being arranged beneath the cover plate 5 and extending longitudinally within the sight opening 8, and mounted over said roller is a price indicating chart 10, the ends 11 of said chart being secured to respective winding rollers 12 which are borne by shafts 13 that are supported by the end members 2 and 3 adjacent the base 1.

Mounted on each of the shafts 13 adjacent the end member 2 is a pinion 14, and in mesh with said pinions is an intermediately arranged spur gear 15 which is mounted on a stub shaft 16, said stub shaft being supported by the end member 2, and for turning said spur gear 15 is a hand engageable knob 17 which is secured to the shaft 16 on the outside of the end member 2.

Having its opposite ends journaled, respectively, in the end-members 2 and 3, is a rotatable worm-shaft or actuator 18, soon to be more particularly described. The adjacent end of the actuator 18 is extended through and projects beyond the end wall 3, as at 31, for supporting a cylindrical cup-shaped member operatively conjoined to and forming a measuring surface portion 19 of a material operable feed roller 20 mounted on the extension 31 of said shaft 18 for rotation therewith, for a purpose soon appearing. However, it may be here stated, that said roller 20 is adapted for rolling engagement with the cloth to be measured in such manner as to rotate the actuator 18 and the measuring surface portion 19 proportionately to the length of cloth measured.

This feed roller 20, Figs. 12 and 13, is adapted for adjustment of its perimeter relatively to the measuring surface 19 suitably to measure cloths of different thicknesses on rolling engagement therewith and includes a plurality of segmental portions 21, each portion 21 having an inclined arcuate surface 22 and an inclined arcuate surface 23, said surfaces 22 and 23 being extended from inwardly extending arms 40 and 40a which are extended from each portion 21. The inclined portions 22 and 23 form hollow cones 24 and 25 when the segmental portions 21 are mounted together, as shown, and are for co-operation with respective inclined surfaces 26 and 27 or respective inclined surfaces 28 and 29, as presently appearing, said surfaces 26, 27, 28 and 29 being extended from a sleeve 30 which is threadingly engaged on the extension 31 of the worm shaft 18 and is adjustable thereon. Mounted on the shaft extension 31 between the measuring surface portion 19 and one end of the sleeve 30, is a spring 32, Fig. 11, and for engagement with the opposite end of said sleeve is a lock nut 33 which is mounted on the threaded portion 34 formed on said shaft extension 31, and for turning said sleeve are hand engaging portions 35. For closing the open end 36 of the feed roller 20, a circular plate 37 is provided, said plate being secured in place by a securing screw 38 which is mounted on the shaft extension 31.

The structure just related relative to the feed roller 20 is for the purpose of decreasing or enlarging the diameter of said roller by which the measuring circumference thereof will be decreased or increased, and in this connection, if it is necessary to slightly increase the diameter of the roller after the closure plate 37 has been removed and the lock nut 33 loosened, the hand engaging portions 35 are manipulated so as to turn the sleeve 30 in a left hand direction thereby causing the conical shaped inclined surfaces 26 and 27 to bear against respective inclined portions 22 and 23, and force the segments 21 outwardly.

If it is desired to decrease the size of the roller 20 it is obvious that by manipulating the sleeve 30 in an opposite direction, the inclined portions 28 and 29 of said sleeve will respectively bear inwardly against inclined portions 22 and 23 of the segments 21 and draw said segments inwardly. For holding the adjusted positions of the segments 21 of the feed roller 20, the lock nut 33 is operated against the adjacent end of the sleeve 30, and for keying the feed roller 20 to the worm shaft 18, a vertical slot 39, Fig. 13, is provided in each side portion 40 of each of the segmental portions 21, each of said slots being engaged by respective projections 41, which are borne by the measuring surface portion 19, whereas the portion 19 is secured to the shaft by pinning as shown in Figs. 4 and 8.

Arranged in horizontal and parallel relation with the worm shaft 18 and supported between the end members 2 and 3 is a guide rod 42, Figs. 4, 6 and 10, and slidably mounted on said rod and said worm shaft is an indicating carriage 43 adapted to determine a selected measursement on operative association with a setting means as presently appearing, and bearing an indicating hand 44, which is adapted to register with the quantity scale 6 and characters on the chart sheet 10, and borne by said carriage is a reciprocally mounted spring pressed locking member 45, Fig. 10, for engagement with the teeth of the worm shaft, said locking member 45 bearing a manipulating knob 46.

Arranged beneath the worm shaft 18 and supported between the end members 2 and 3 is a horizontally extending bar 47, bearing a plurality of teeth 48 which are formed on one side thereof, the number of said teeth being equal to the number of threads on the worm shaft, and for engagement with said teeth 48 is a spring pressed locking member 50 which is borne by a setting carriage 51 that is slidably mounted on said bar 47 and for the further support of said carriage 51 is a rockable bar 52, Figs. 5 and 9, which is arranged parallel to the bar 47 and supported in the end members 2 and 3. One end of the locking member 50 is extended through a longitudinally exposed slot which is formed in the casing or covering of the measuring device, said member 50 being in a position accessible to the operator. Mounted on one end of said bar 52, is a stop dog 53, Fig. 7, and for rocking said bar 52 is a spring actuated member 54, Fig. 9, which is carried by the carriage 51 and has a portion 55 which projects upwardly therefrom, said member 54 being slidably related to said bar 52 and keyed thereto by the flat surface 56 thereof bearing against the flat side 57 of said bar.

The projecting portion 55 of the member 54 is extended so as to be within the horizontal traveling plane of the depending cam surface 58 of the indicating carriage 43, Figs. 5 and 9, so that when said carriage 43 has traversed the worm shaft 18 to a position wherein the indicating hand 44 thereof is in register with the indicating hand 59 of the setting carriage 51, the cam surface 58 borne thereby will bear against the portion 55 of the member 54 of the setting carriage, thereby turning said member 54 and rocking the bar 52, bearing the stop dog 53.

A stopping projection 60 is provided on one end of the worm shaft 18 adjacent the end member 3, said projection being for co-operation with the dog 53, Fig. 7, and paralleling said shaft 18 is a combined releasing and locking bar 61, reciprocally mounted in the end members 2 and 3, said bar bearing a projection 62 adjacent the end member 3, and for co-operation with said projection is an engaging portion 63 of a bell crank lever 64, which is pivoted at 65 to the end member 3, the extending end 66 of said lever 64 bearing a pin 67 which is engaged within the bifurcated end 68 of a vertically reciprocable member 69, which is mounted against the end member 3. Borne by the extending end 70 of the lever 64 is a pin 71, engaging within a slot 72 of a swingable locking member 73, which is pivoted at 74 to the end member 3, and formed on said member 73 is a stopping portion 75 which is co-operable with a projection 76, Figs. 7 and 8, of a releasing lever 77 which is pivoted at 78 to the opposite side of the end member 3 to which the locking member 73 is secured, said projection 76 passing through a slot 79 formed in said end member 3.

Bearing against the upper portion of the lever 77 is an arm 80, Fig. 8, of a swingable frame 81 which is mounted on an axle 82, said axle being supported at one end in the end member 3 and at its opposite end in a bearing 84, Fig. 5, which is extended upwardly from the base extension 85 and borne by said frame by a universal mounting or gimbal device, as presently appearing, is a roller supporting frame 86 which is swingably secured thereto by the axle 87, said frame 86 supporting a pair of spaced apart parallel gripping rollers 88 which are adapted to under-engage the feed roller 20, said gripping rollers being caused to normally bear against the feed roller by pressure of the coil spring 89 which is mounted on the axle 82 and co-operable with the swingable frame 81.

Extending upwardly from the base 1 and the base extension 85 adjacent the hand engaging end 90 of the releasing lever 77 is a knife bearing block 91, Figs. 4 and 8, through which is formed a vertical slot 92 through which the hand engaging portion 90 of the lever 77 extends, and pivoted at 93 to said block is a marking or cutting knife 94, the cutting edge of which is co-operable with the block 91, and for actuating said knife in a cutting direction a finger engaging portion 95 is formed thereon, said knife being actuated in the opposite direction by a spring 96.

One end of the part 19 of the feed roller 20 is hollowed out, as designated at 97, Figs. 11 and 8, thereby providing a peripheral wall 98 in which is formed a locking slot 99, and for engagement in said slot is a projection 100, which is extended from the bell crank lever 64, Fig. 4, said projection 100 passing through the circularly formed slot 101, Fig. 8, of the end member or wall 3.

Formed in the rear portion of the block 91 adjacent the pivot 93, Fig. 4, to which the knife 94 is secured is a slot 102, Fig. 5, and borne by said knife and projecting through said slot is a projection 103, said projection adapted to engage a swinging member 104 which is pivoted at 105 to the block 91, said member 104, Figs. 5 and 7, having its extending end 106 engaged within a slot 107 which is formed in the depending extremity 108 of the reciprocable member 69.

The feed roller 20 is of a diameter wherein the circumference thereof will measure one-eighth of a yard or four and one-half inches and as shown in Figs. 1 and 5 the cylindrical measuring surface or band 19 is provided with the inch measurements and fractions thereof as pertaining to the said one-eighth of a yard or four and one-half inches, the cipher of said measuring surface 19 designating a neutral or zero position when arranged upwardly and centrally as shown in Fig. 1, and registering with the indicating mark 109, and at the commencement of measuring a length of material, it is essential that the indicating carriage 43 be located on the shaft 18, so that the rear end of said carriage will engage the pin 110, Fig. 5, of the releasing and locking bar 61, so as to hold said bar in retracted position against the pressure of the spring 111 which is secured to the bar 61 and to the end member 3, Fig. 5, and in such position of said carriage, the indicating hand 44 thereof will indicate a neutral position on the quantity scale 6.

When it is desired to engage a length of material to be measured beneath the feed roller 20, the hand-engaging end 90, Fig. 8, of the lever 77 is lifted upwardly and held up, thereby lowering the gripping rollers 88 from the roller 20 and the forward edge of the material upon being inserted between the pair of rollers 88 and roller 20 is brought to a position in line with the cutting edge of the block 91, and the lever 77 is then released, thereby allowing the rollers 88 to engage the material against the roller 20.

Either before or after inserting the material to be measured between the rollers 88 and 20, the setting carriage 51 is released from its locked position with the bar 47 by the operator inwardly pressing the locking member 50 and unlocking it from engagement with the teeth 48 of said bar, the operator while still holding the member 50 inwardly, moving the carriage 51 therewith along the bars 47 and 52 on which it is mounted to a predetermining position relative to the amount of goods to be passed between said rollers and measured. As shown in Fig. 1, if nine yards is the amount desired, the indicating hand 59 of said setting carriage is placed at a position of register with the numeral "9" of the quantity scale 6. The forward portion of the length of material is then pulled, thereby rotating the feed roller 20 along with the worm shaft 18, and causing the indicating carriage 43 to traverse said shaft towards the feed roller, and as said carriage 43 reaches a position above the setting carriage 51, the cam surface 58, Fig. 5, borne by the carriage 43 will bear downwardly on the portion 55 of the member 54 borne by the setting carriage 51, and rock the bar 52, Fig. 9, and the stop dog 53 thereof will be moved so that said dog will be placed in the path of travel of the projection 60, Fig. 7, of the worm shaft 18, in which position the worm shaft will be prevented from further turning when the projection 60 thereof engages the dog 53.

The pitch of the threads of the worm shaft 18 is such wherein one revolution of said shaft will cause the indicating carriage 43 to travel and indicate one-eighth of a yard on the quantity scale 6, therefore, the position of stopping of said shaft relative to the projection 60 thereof engaging the dog 53 will always be in a position of one-eighth of a yard measurement, and when the cam surface 58 of the carriage 43 actuates the member 54 of the carriage 51, the dog 53 will have moved to engage the projection 60 of the shaft 18 at the time when the indicating hand 44 of the carriage 43 has reached a position of registry with the indicating hand 59 of the carriage 51, thereby indicating to the operator that the predetermined amount of nine yards had been passed beneath the feed roller 20, and in which the shaft 18 will be locked against further movement.

Since the circumference of the measuring surface 19 of the feed roller 20 measures one-eighth of a yard, the position of stopping of the shaft 18 leaves the cipher of the measuring surface 19 in register with the indicating mark 109, and in this position of stopping, the slot 99, Fig. 8, formed in the peripheral wall 98 of the feed roller 20 is in an alining position with the projection 100 of the bell crank lever 64, such registering positions of the slot 99 and projection 100 allowing the knife 94 to be actuated downwardly by the operator for cutting or marking the goods after measuring, and in which the operator upon pressing the finger portion 95 of the knife, will cause the knife to be moved downwardly and the projection 103, Figs. 4 and 5, of said knife will bear against and downwardly move the member 104, and inasmuch as the member 104 is in engagement with the lower extremity of the reciprocable member 69, Fig. 7, said member will be moved downwardly thereby swinging the bell crank 64, and in which the projection 100 of said bell crank will traverse the slot 99 thereby locking the feed roller 20 against further turning.

When the knife 94 is released, it will be returned to its neutral position by the spring 96, Fig. 4, said knife, however, in its returning movement being inactive on the reciprocable member 69 and bell crank 64, Fig. 7, on account of said part 64 being held in its moved position by engagement of the projection 62 of the locking bar 61 being drawn beneath the engaging portion 63 of the bell crank lever 64 as said lever was moved, said bar being actuated by the spring 111. In this connection the projection 100 of the bell crank lever 64 will be held in the slot 99 of the feed roller 20.

The moving of the bell crank lever 64 by the downward actuation of the knife 94 causes the swinging locking member 73, Fig. 7, to move and elevate the stopping portion 75 thereof away from the projection 76 of the gripping roller releasing lever 77, Fig. 8, thereby allowing the operator to elevate the hand engaging end 90, of said lever 77, the upward movement of said lever bearing against the arm 80 of the frame 81, and inasmuch as said frame is swingable on the axis 82, the gripping rollers 88 will be released from engagement with the feed roller 20, so that the operator can remove the goods from between said rollers 88 and said feed roller.

From the foregoing description relative to the actuation of the knife 94 towards cutting, it is obvious that said knife could not be operated downwardly until the feed roller 20 was placed in just such a position wherein the projection 100 of the bell crank lever 64 could enter the slot 99 of the feed roller 20, and in connection therewith the goods or material between the gripping rollers 88 and feed roller 20 could not be removed, and for predetermining the time of actuation of the knife so that it cannot be actuated until a predetermined amount of material has been measured by the feed roller 20, a locking arm, 112, Fig. 7, is extended from the dog 53 for engagement with an abutting portion 113 borne by the bell crank lever 64, said locking arm 112 preventing the lever 64 being moved by actuation of the knife 94 while the indicating carriage 43 is traversing the shaft 18 and until the dog 53 has been actuated towards stopping the rotation of the shaft 18 by the actuation of the cam surface 58, Fig. 5, of the indicating carriage 43 on the member 54 of the setting carriage 51, such moved stopping position of the dog 53 moving the locking arm 112 from engagement with the abutting portion 113 of the lever 64, leaving said lever 64 free to be moved upon actuation of the knife 94, said dog 53 being then locked in stopping position by said arm 112 engaging the under side of portion 113 until return of member 64 to normal position, whereby the actuator 18, lockable by the dog 53, is in conjoint locking relation with the roller 20.

For releasing and resetting the parts after a desired amount of material has been measured and cut, the indicating carriage 43 upon being moved to a neutral position relative to the quantity scale 6, will engage and press against the projection 110, Fig. 5, which extends from the locking bar 61 adjacent the end member 2, thereby drawing said bar rearwardly and releasing the projection 62 borne thereby from engagement with the portion 63 of the bell crank lever 64 thereby allowing said lever to be moved to the position shown in Fig. 7 by the drawing action of the spring 115 of the reciprocable member 69. In returning the indicating carriage 43 to its neutral position, when the cam surface 58 thereof was released from the member 54 of the setting carriage 51, said member 54 upon being released allowing the spring 116, Fig. 9, to become active upon the dog 53 and rock shaft 52, thereby returning said dog to its neutral position.

To obtain predetermined measurements of the material by use of this machine it is desirable that the carriage 51 be moved to position wherein the portion 55 engages the cam 58 of the carriage 43. This holds the bar 52 in its rocked position and the locking arm 112 below the abutting portion 113 of the lever 64 so that the gripping rollers 88 may be moved from the feed roller 20 to permit the cloth to be inserted between the rollers. Next, in making predetermined measurements, the carriage 51 is moved to its proper position along its supporting bars 47 and 52.

The setting of the predetermining carriage 51 relative to indicating a desired amount of material to be measured is mainly used when a number of yards is desired, as the operator can then continually exert a pull on the material during the feeding operation of the material beneath the feed roller without paying attention to the travel of the indicating carriage 43, for as already described the rotation of the feed roller 20 will be stopped when the indicating carriage 43 has traveled to registering position with the predetermining or setting carriage 51. In measuring short lengths of material in which the travel of the indicating carriage 43 on the worm shaft 18 will not be great, the use of the setting carriage 51 can be dispensed with, as the operator can readily follow the travel of the indicating carriage on the quantity scale 6 during the pulling of a short length of material beneath the feed roller, and in order to carry out the short length measuring operation the locking member 50 of the setting carriage 51 is released from the teeth of the bar 47, so that said carriage can be moved along said bar to a position adjacent the end member 3 and inasmuch as said carriage is also supported on the rock bar 52 the dog 53 will be engaged by the moving carriage 51 and moved on said bar into the pocket 117 provided in the end member 3, said dog 53 when so moved being ineffective towards being co-operable with the projection 60 of the worm shaft 18 and the abutting portion 113 of the bell crank lever 64.

In eliminating the use of the dog 53 towards affecting a lock on the knife 94 and feed roller 20 the lock created by the projection 100 of the bell crank lever 64 being co-operable with the peripheral wall 98 of the feed roller 20 is relied upon to prevent cutting operation of the knife 94 and releasing operation of the gripping rollers 88 and in which said knife can not be operated or the gripping rollers released from the feed roller until the desired amount of short length material has been properly measured, for as already stated, the cipher of the measuring surface 19 must register with the indicating mark 109 before the projection 100 can enter the slot 99 of the feed roller 20 before the knife 94 can be operated.

If during the measuring of a predetermined length of material, or after a length of material has been measured out and the material has not been moved from between the pair of rollers 88 and the feed roller 20, and it is afterwards desired to increase the length of the measured piece of material, the locking member 50 of the setting carriage 51 is engaged so as to release it from its predeterminedly set position on the bar 47 and said carriage is then advanced along said bar so that the indicating hand 59 thereof can be located in an advanced position relative to the quantity scale 6. After the setting carriage 51 has been moved away from the indicating carriage 43 it is obvious that the member 54 of the setting carriage was released from the cam surface 58 of the indicating carriage whereby the dog 53 was released from or moved out of the path of travel of the stopping projection 60 of the worm shaft 18 by the action of the coil spring 116 which is secured to the lower end of the member 54 and the carriage 51.

If it is desired to measure a length of material of which the length thereof will end in inches such as nine and one-third yards, or nine yards and twelve inches, the operator on predetermining the location of the setting carriage 51 will locate the indicating hand 59 thereof in a position of indication with a mark or indication of the quantity scale 6 next below a mark higher than the desired inch measurement and in the instance of providing a setting for the predetermined indication of nine and one-third yards the hand of the setting carriage will be located at a position of register with the 9¼ indication of the quantity scale 6 and after the measurement of 9¼ has been fed between the pair of rollers 88 and the feed roller 20, the setting carriage 51 is then moved forwardly by the operator so that the feed roller 20 can be operated further, and owing to said roller being stopped by the action of the dog 53 at which time the cipher of the measuring surface 19 thereof will be in register with the indicating mark 109, the operator will then further engage and pull on the material relative to increasing the measured length thereof to nine yards and twelve inches, from the measurement of 9¼ yards or nine yards and nine inches, such further measurage being taken from the measuring surface 19 of the feed roller 20 and not by the traveling indication of the carriage 43 and when the indicating character 3 of the measuring surface 19 has travelled to a position of register with the indicating mark 109, the desired amount of material measuring nine and one-third yards has been measured.

On account of the knife being capable of actuation only when the cipher of the measuring surface 19 is in register with the indicating mark 109, the operator will have to hand cut the measured material at the location of the cutting block 91.

In measuring remnants of material, the setting carriage 51 is wholly disregarded and moved forward to an ineffective position relative to the carriage 43, and on account of the forward portion of the material not being engaged by the roller 20 owing to said roller being located a distance away from the cutting block 91, the indicating carriage 43 is released and moved to a position of register with the first ⅛ yard measurement of the quantity scale 6 before the measuring operation is carried on, said ⅛ yard measuring indication being equal to a length of material extending from the ledge 119 which is marked or designated as "remnant end" to the cutting block 91. In the operation of measuring on a remnant length and on the pulling of said length through the rollers, care is taken so that the operation of the feed roller will be stopped when the rear end of the remnant length has reached the ledge 119, and in which the length of the rear portion of the material extending from the cutting block 91 over the feed table 120, between the rollers 88, feed roller 20 to said ledge 119 as shown by the dotted lines designated at 121, will measure one-eighth of a yard, said length of one-eighth of a yard being that portion which was previously indicated as measured on the quantity scale 6 before the measuring operation of the remnant length was begun, such a method of measuring calculation being brought about on account of the cutting block 91 and feed roller 20 being arranged a distance from one another, in which the measuring distance from the vertical center of said feed roller on its lower periphery to the edge of said cutting block is one-sixteenth of a yard.

The supporting frame 86 of the gripping rollers 88 is adapted to swing in two directions relative to the feed roller 20 and in order to make both of the swinging movements automatic, the axis 87 of the frame 86 is turnable in a universal mounting or gimbal device including a centrally arranged block 122 which is supported from opposing pintles 123 each of which is supported from cross bars 124, said cross bars being borne by the frame 81. With such a swinging arrangement of the supporting frame 86, provision is made whereby the gripping rollers 88 can automatically seat themselves in a transverse direction or position relative to the feed roller 20 as well as automatically and longitudinally seating themselves to the feed roller lengthwise thereof, thereby providing assurance that the gripping rollers will engage the periphery of the feed roller their entire length, all of which is for the purpose of providing a maximum of gripping surface so that slipping of material when pulled between the pair of gripping rollers and the feed roller is prevented.

All of the aforesaid construction relates more particularly to the mechanism pertaining to the measuring operation of the device, the calculation of the price of the material measured or to be measured being carried out by the co-operation of the parts aforereferred to as the grade scale 7, quantity scale 6, and price indicating sheet 10 and in this connection the grade scale 7 is provided with a plurality of different yardage prices denoting different grades of material, whereas the quantity scale 6 is provided with yardage characters measuring in eighths of yards up to 10 yards, and the price chart sheet 10 is provided with a plurality of different prices corresponding to the eighth yardage measurements of the quantity scale 6 and there being a diagonal line 125 extending from adjacent the lower left-hand corner of the sheet 10 to the upper right-hand corner thereof. The diagonal line 125 is co-operable with the grade scale 7 and the indicating sheet 10 for carrying out an improved method of calculation, as disclosed in Letters Patent No. 1,503,076.

In the measuring operation on the material it is obvious that the indicating hand 44 of the indicating carriage 43 will simultaneously point out the price of the measured material on the double column of the indicating sheet 10 which is disclosed through the sight opening 8 as well as the amount of material measured. For holding the chart sheet in a locked position against being disturbed by another operator, while the original operator is conversing with a customer, a locking member 126, Fig. 5, is provided, said member being spring actuated and reciprocable within the end member or wall 2, and has a portion 127 adapted to engage within the teeth of the gear 15, said locking member 126 having an extending portion 128 arranged in the path of travel of the carriage 43 so that when said carriage is moved to its neutral position, the portion 128 will be engaged, thereby forcing the teeth engaging portion 127 from engagement with the teeth of the gear 15, the locking of said gear only being affected after the measuring operation has begun and the carriage 43 has moved a distance on the shaft 18.

For withholding the locking member 126 from locking engagement with the gear 15, the knob 129 is engaged and pulled and the retaining member 130 is pushed downwardly, thereby introducing said retaining member between the knob and the end wall 2.

In measuring material which is so fine that it does not have enough body to it to withstand the pulling strain thereon between the rollers, the worm shaft 18 is manipulated by hand, in which the turning knob 131, which is provided on one end of said shaft, is engaged by the operator and turned in a left hand direction.

For preventing the operator from accidentally removing the material from between the rollers 20 and 88 after the measuring operation and without cutting the material, a bell crank lever 132, Fig. 7, is pivoted at 133 to the end member 3, said lever 132 having an arm 134 which is adapted to be borne against by the pin 135 which is carried by the reciprocable member 69, said lever 132 having a depending arm 136 which has an engaging portion 137, said portion 137 normally being arranged in the path of travel and against a stop pin 138 which is carried by the swingable locking member 73, said portion 137 being held against the pin 138 by a spring 139. In this position of the bell crank lever 132 relative to the members 69 and 73, if the operator attempted to remove the material from between the rollers before actuating the knife 54, the releasing upward movement of the lever 77 relative to swinging the frame 81 which carries the gripping rollers 88, would be prevented on account of the stop pin 138 being in abutting engagement with the portion 137 of the bell crank lever 132, said stop pin preventing the swingable member 73 being actuated by the projection 76 of the lever 77.

When the operator, however, bears downwardly on the knife 94 after a proper measuring operation, the reciprocable member 69 will be moved downwardly, and upon the initial movement of said member 69, the pin 135 will bear against the arm 134 of the bell crank lever 132, thereby swinging the arm 136 of said lever 132 so that the engaging portion 137 thereof is moved from abutment with the stop pin 138 of the swingable member 73, such swinging movement of said lever 132 being brought about before the bifurcated end 68 of the reciprocable member 69 has become effective on the pin 67 of the bell crank lever 64, and as the knife continues to move towards cutting position, the lever 64 will actuate the member 73, and the projection 62 of the locking bar 61 will affect the lock on the bell crank lever 64 and incidentally lock the members 69 and 73 in their moved positions, as shown in Fig. 6, and in which the moved position of the locking member 73 will permit the projection 76 of the roller releasing lever 77 to be actuated for moving the gripping rollers from engagement with the material between them and the feed roller.

If, however, the operator for any reason desires to manually move the locking bell crank lever 132 to an ineffective position relative to the locking member 73, the button 140, Fig. 4, is turned so as to cause the arm 141, Fig. 7, to bear against the end 142 of the bell crank lever 132, thereby swinging the depending arm 136 of said bell crank lever out of engagement with the stop pin 138 of the members 73, said button 140 and arm 141 being mounted on the shaft 143 which is extended through the end member 3.

For preventing the indicating carriage 43 from being accidentally moved forwardly from the zero or neutral position as indicated by the hand 44 thereof as shown in Fig. 1, a pawl 144, Figs. 4 and 10, is secured to one side of said carriage, for engagement with the threads of the worm shaft 18. In this connection the pawl 144 will bear against a thread of said worm shaft adjacent the indicating carriage 43 as shown in Fig. 4 so that said carriage can not be moved forwardly by hand operation.

What I claim is:—

1. In a measuring machine, an actuator, a carriage borne by and movable along said actuator, a measuring scale co-operable with said carriage, a pair of friction rollers one of which operates said actuator, severing means for operating on the measured material, operating means for said severing means, other means to be actuated by said operating means and means to prevent such actuation unless one of said rollers is in a determined position.

2. In a measuring machine, an actuator, a carriage borne by and movable along said actuator, a scale co-operable with said carriage, a measuring roller for operating said actuator, severing means for operating on the material after it has been measured by said roller, operating means for said severing means, and other means co-operable with said operating means having a part which is co-operable with said roller when said roller is moved into a determined position.

3. In a measuring machine, the combination of a feed roller having a circumference equal to one-eighth of a yard, a shaft to which said roller is secured, a quantity indicating scale bearing one-eighth yard graduations, and an indicating carriage movably mounted on said shaft and adapted to travel the approximate length of said scale.

4. In a measuring machine, the combination of a worm shaft, a material feed roller for operating said shaft, a friction roller co-operable with said feed roller, a quantity indicating scale, an indicating carriage movable along and by said shaft and said scale, a knife for operating on the material after it has passed between said rollers, locking means co-operable with said feed roller, and a member co-operable with said knife and said locking means to be actuated by said knife, and means co-operable with said member for preventing said friction roller from being moved from co-operation with said feed roller.

5. In a measuring machine, the combination of a material feed roller, an actuator operated by said roller, a quantity scale, an indicating carriage adapted to be operated by said actuator along said scale, a stopping mechanism co-operable with said actuator to stop operation of said actuator positively, a setting carriage for predetermining the distance of travel of said indicating carriage, and means borne by said setting carriage for actuating said stopping mechanism to position to stop rotation of said actuator positively, said means adapted to be actuated by said indicating carriage.

6. In a measuring machine, the combination of a material feed roller, a scale, an actuator operated by said roller, an indicating carriage mounted on said actuator for movement along said scale, a setting carriage co-operable with said scale adapted to be set a predetermined distance forwardly of said indicating carriage, a stopping mechanism co-operable with said actuator, and means borne by said setting carriage for actuating said mechanism, said indicating carriage having means adapted during its travel to engage said actuating means.

7. In a measuring machine, the combination of a material feed roller, a worm shaft operable by said roller, means co-operable with said shaft for forming a lock thereto, an indicating carriage mounted on said shaft and movable thereby, and an adjustable member having a movable portion for co-operation with said locking means of said shaft and said carriage.

8. In a measuring machine, in combination, a material measuring roller, a worm shaft operable by said roller, an indicating carriage mounted on said shaft, shaft-locking means, adjustable means co-operable with said indicating carriage for actuating said shaft locking means, a knife for cutting the material, and knife-locking means co-operating with said shaft-locking means for preventing actuation of said knife while said measuring roller is measuringly operating on the material.

9. In a measuring machine, in combination, a material measuring roller, a worm shaft operable by said roller, an indicating carriage mounted on said shaft, shaft-locking means, adjustable means co-operable with said indicating carriage for actuating said shaft locking means, a knife for cutting the material, knife-locking means co-operating with said shaft-locking means for preventing actuation of said knife while said measuring roller is measuringly operating on the material, a pair of gripping rollers normally adapted to grip the material against the measuring roller, means for releasing said gripping rollers from material gripping position, and means co-operable with said knife-locking means for locking said releasing means against releasing movement.

10. In a measuring machine, in combination, a material measuring roller, an actuator operable by said roller, an indicating carriage actuable by and along said actuator, a setting carriage located in the path of travel of said indicating carriage, a stopping member co-operable with said actuator, means borne by the setting carriage for actuating the stopping member, and means borne by the indicating carriage adapted during its travel to engage said actuating means.

11. In a measuring machine, the combination of a material feed roller, a worm shaft operable by said roller, an indicating carriage mounted on said shaft, a knife for cutting the material after it has been measured by said roller, a locking mechanism for preventing said knife from being actuated while said roller is operating on the material, a stopping member co-operable with said shaft, and a setting carriage adapted to be arranged forwardly of said indicating carriage, said setting carriage having means related to said member and said indicating carriage, said indicating carriage being adapted to engage and actuate said means of said setting carriage, said member being co-operable with said locking mechanism for releasing it.

12. In a measuring machine, in combination, a measuring roller, a marking element located at a distance from and adapted to be moved across the path of material measured by said roller, a member having a measuring ledge located a distance from, and on the side of, said roller opposite to that of said marking element for defining a measured length of material between said ledge and said element, an indicating means actuable by said measuring roller, and a scale co-related with said measured length and said indicating means.

13. In a measuring machine, a measuring roller, a gripping roller co-operable with said measuring roller, supporting means for said gripping roller, said supporting means adapted to be moved so that the gripping roller can be disengaged from co-operation with said measuring roller, a knife, a locking mechanism for said knife, said supporting means of said gripping roller having a portion in co-operation with said locking mechanism.

14. In a measuring machine, a measuring roller, a gripping roller adapted to co-operate with said measuring roller, a frame for the support of said gripping roller, said frame being pivoted so as to swing both transversely and laterally of said measuring roller.

15. In a measuring machine a movable chart, means for operating said chart, locking means normally engaging said chart operating means, and a movable indicating member co-operable with said chart adapted when at neutral position to engage said locking means for disengaging the same from said chart operating means.

16. In a measuring machine the combination of a measuring roller, an actuator operated by said roller, a member co-operable with said actuator for forming a lock thereto, means for actuating said member, and an indicating carriage mounted on said actuator adapted to engage said means and actuate said member to a locking position relative to said actuator.

17. In a measuring machine, an actuator, a measuring roller for operating said actuator, a graded scale, a traveling indicator co-operable with said scale operated by said actuator, adjustable means adapted to be arranged forwardly of said indicator, locking means for said actuator for preventing operation thereof and actuating means borne by said adjustable means to be acted on by said indicator during the travel of said indicator.

18. In a measuring machine, a support, a setting carriage movable along said support, a rotary threaded actuator shaft, an indicating carriage screwed on said shaft and movable along said shaft when said shaft is rotated, mechanism for rotating said shaft to move said indicating carriage toward said setting carriage, a lock for said shaft, and means in said setting carriage and operated by said indicating carriage to move said lock to position to stop rotation of said shaft.

19. In a measuring machine, a support, a setting carriage movable along said support, a rockable bar cooperating with said support to support said setting carriage, a rotary threaded actuator shaft, an indicating carriage, a part in said indicating carriage having threaded engagement with said shaft for movement by said shaft, mechanism for rotating said shaft to move said indicating carriage toward said setting carriage, devices supported by said setting carriage and operated by said indicating carriage for rocking said rockable bar, and means operated by said rockable bar for stopping rotation of said shaft.

20. In a measuring machine, a support, a setting carriage movable along said support, a rockable bar cooperating with said support to support said setting carriage, a rotary threaded actuator shaft, an indicating carriage, a part in said indicating carriage having threaded engagement with said shaft for movement by said shaft, mechanism for rotating said shaft to move said indicating carriage toward said setting carriage, devices supported by said setting carriage and operated by said indicating carriage for rocking said rockable bar, and means operated by said rockable bar for stopping rotation of said shaft.

21. In a measuring machine, a support, a setting carriage movable along said support, a rockable bar cooperating with said support to support said setting carriage, a rotary threaded actuator shaft, an indicating carriage, a part in said indicating carriage having threaded engagement with said shaft for movement by said shaft, mechanism for rotating said shaft to move said indicating carriage toward said setting carriage, devices supported by said setting carriage and operated by said indicating carriage for rocking said rockable bar, means operated by said rockable bar for stopping rotation of said shaft, and means for releasing said stopping means from said shaft when said indicating carriage is moved away from said setting carriage.

22. In a measuring machine, a laterally adjustable setting carriage, a rotary threaded actuator shaft, an indicating carriage, a part in said indicating carriage having threaded engagement with said shaft for moving said indicating carriage toward said setting carriage, an element settable in position to stop rotation of said shaft, and a device in said setting carriage and operated by said indicating carriage for moving said element to position to stop rotation of said shaft.

23. In a measuring machine, a laterally adjustable setting carriage, a rotary threaded actuator shaft, an indicating carriage, a part in said indicating carriage having threaded engagement with said shaft for moving said indicating carriage toward said setting carriage, an element settable in position to stop rotation of said shaft, a device in said setting carriage and operated by said indicating carriage for moving said element to position to stop rotation of said shaft, means for releasing said part in said indicating carriage from threaded engagement with said shaft and moving said indicating carriage away from said setting carriage to a starting position, and means for disengaging said stopping device from said shaft.

24. In a measuring machine, a cloth-operated measuring roller, a pair of gripping rollers adapted to press the cloth on the measuring roller, a swingable member mounted for movement towards or away from said measuring roller, and a universal mounting supporting said gripping rollers on said member.

25. In a measuring machine, a support, a setting carriage movable along said support, a rockable bar cooperating with said support to support said setting carriage, a rotary threaded actuator shaft, an indicating carriage, a part in said indicating carriage having threaded engagement with said shaft for movement by said shaft, mechanism for rotating said shaft to move said indicating carriage toward said setting carriage, devices supported by said setting carriage and operated by said indicating carriage for rocking said rockable bar, and means operated by said rockable bar for stopping rotation of said shaft, said means including a dog slidably spring set on said rockable bar for rocking movement therewith, and a projection on said actuator shaft adapted to engage said dog, said dog being movable on engagement by said setting carriage away from the path of said projection.

26. In a measuring machine, a measuring means, a severing means, means normally locking said severing means against severing movement, and means adapted to be operatively associated with said measuring means, on determination thereby of a selected measurement, for releasing said locking means.

27. In a measuring machine, a material operable measuring roller, a lockable actuator operable by said measuring roller, a carriage borne by and along said actuator, a measuring scale cooperable with said carriage, actuator locking means associated with said carriage for actuation thereby when in a determined position, roller locking means normally latched by said actuator locking means adapted for actuation when said measuring roller and carriage are in determined positions, holding means adapted to retain said roller locking means in actuated position, and means associated with said holding means cooperable with said carriage on movement thereof from said determined position for releasing said roller locking means.

28. In a measuring machine, a material operable measuring roller, a lockable actuator operable by said measuring roller, a carriage borne by and along said actuator, a measuring scale cooperable with said carriage, actuator locking means associated with said carriage for actuation thereby when in a determined position, roller locking means normally latched by said actuator locking means adapted for actuation when said measuring roller and carriage are in determined positions, holding means adapted to retain said roller locking means in actuated position, means associated with said holding means cooperable with said carriage on movement thereof from said determined position for releasing said roller locking means, and means operable on release of said holding means for returning both of said locking means to normal position.

29. In a measuring machine, a material operable measuring roller, a gripping roller separable from but normally grippingly associated with said measuring roller, a lockable actuator operable by said measuring roller, a carriage borne by and along said actuator, a measuring scale cooperable with said carriage, actuator locking means associated with said carriage for actuation thereby when in a determined position, roller separating means, and operating means for said separating means normally latched by said actuator locking means adapted for actuation when said measuring roller and carriage are in determined positions.

30. In a measuring machine, a material operable measuring roller, a gripping roller separable from but normally grippingly associated with said measuring roller, a lockable actuator normally operable by said measuring roller, a carriage borne by and along said actuator, a measuring scale cooperable with said carriage, actuator locking means associated with said carriage to be actuated thereby when in a determined position, roller separating means, operating means for said separating means, severing means for operating on the measured material, operating means for said severing means, and locking means operatively associated with both of said operating means normally latched by said actuator locking means adapted for actuation when said measuring roller and carriage are in determined position.

31. In a measuring machine, a material operable measuring roller, a gripping roller separable from but normally grippingly associated with said measuring roller, a lockable actuator normally operable by said measuring roller, a carriage borne by and along said actuator, a measuring scale cooperable with said carriage, actuator locking means associated with said carriage to be actuated thereby when in a determined position, roller separating means, operating means for said separating means, severing means for operating on the measured material, operating means for said severing means, locking means operatively associated with both of said operating means normally latched by said actuator locking means and adapted for actuation when said measuring roller and carriage are in determined position, interlocking means lockingly engaging both of said operating means, and means releasing said interlocking means on actuation of said severing operating means.

FERDINAND J. TILLMAN.